United States Patent
Fumex

(10) Patent No.: US 7,959,360 B2
(45) Date of Patent: Jun. 14, 2011

(54) ANTIFRICTION BEARING FOR A WEAVING LOOM WITH LUBRICATING CAVITY AND WEAVING LOOM PULLING SYSTEM COMPRISING SUCH A BEARING

(75) Inventor: Andre Fumex, Cons Sainte Colombe (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 12/071,230

(22) Filed: Feb. 19, 2008

(65) Prior Publication Data

US 2008/0205807 A1   Aug. 28, 2008

(30) Foreign Application Priority Data

Feb. 22, 2007  (FR) ...................... 07 01274

(51) Int. Cl.
*F16C 43/04* (2006.01)
*F16C 19/00* (2006.01)
(52) U.S. Cl. .................. 384/561; 384/463; 384/485
(58) Field of Classification Search .................. 384/462, 384/463, 477, 484, 485, 488, 561; 139/35, 139/48, 55.1, 56–65, 66 R, 67–77, 66 A, 139/79–81, 82–92, 100–115
See application file for complete search history.

(56) References Cited

U.S. PATENT DOCUMENTS

| | | | |
|---|---|---|---|
| 3,806,212 A | 4/1974 | Piva | |
| 5,001,831 A | 3/1991 | Vinciguerra et al. | |
| 5,228,788 A * | 7/1993 | Vinciguerra | 384/561 |
| 5,237,748 A * | 8/1993 | Glinski | 29/898.062 |
| 5,356,227 A * | 10/1994 | Sibley et al. | 384/463 |
| 5,407,284 A * | 4/1995 | Vinciguerra et al. | 384/561 |
| 6,113,330 A * | 9/2000 | Rupflin | 411/339 |

FOREIGN PATENT DOCUMENTS

| | | |
|---|---|---|
| DE | 43 36 075 A1 | 4/1973 |
| DE | 196 50 731 A1 | 6/1998 |
| DE | 296 23 928 U1 | 9/2000 |
| DE | 199 15 975 A1 | 10/2000 |
| DE | 103 13 320 B3 | 9/2004 |
| DE | 10316320 B3 * | 9/2004 |
| EP | 0 437 896 A2 | 7/1991 |
| EP | 0 602 711 A2 | 6/1994 |
| EP | 0 744 782 A2 | 11/1996 |

* cited by examiner

*Primary Examiner* — Thomas R Hannon
*Assistant Examiner* — Phillip A Johnson
(74) *Attorney, Agent, or Firm* — Dowell & Dowell, PC

(57) ABSTRACT

An antifriction bearing of the roller type for a pulling system of weaving loom including two end plates secured to the inner race and positioned respectively and axially close to each flank of the rollers, end plates lying radially beyond the raceways and the end plates and the inner race being intended to be mounted between two lateral flanges. At least one end plate has a shape defining at least one cavity adjoining all or part of a flank of the rollers and able to accept a lubricant. The inner race has two lateral shoulders each one defining an axial bearing surface for each flange, and a width of the inner race with its lateral shoulders is substantially equal to a distance separating the outermost axial faces of the end plates.

11 Claims, 3 Drawing Sheets

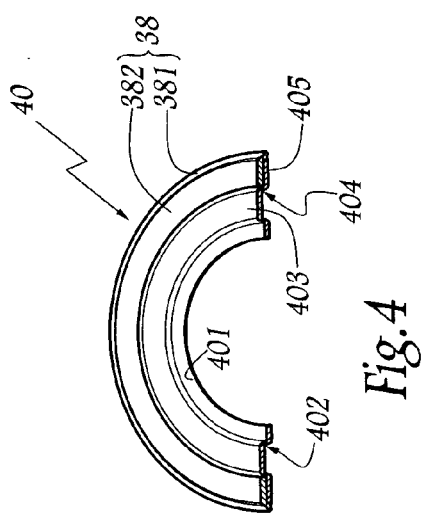
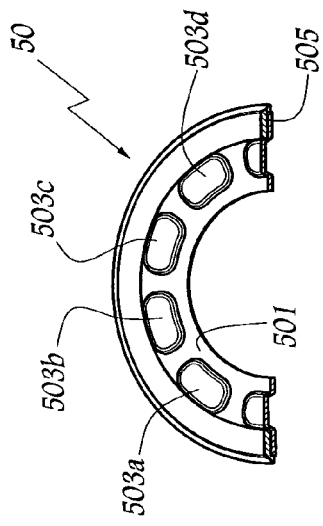
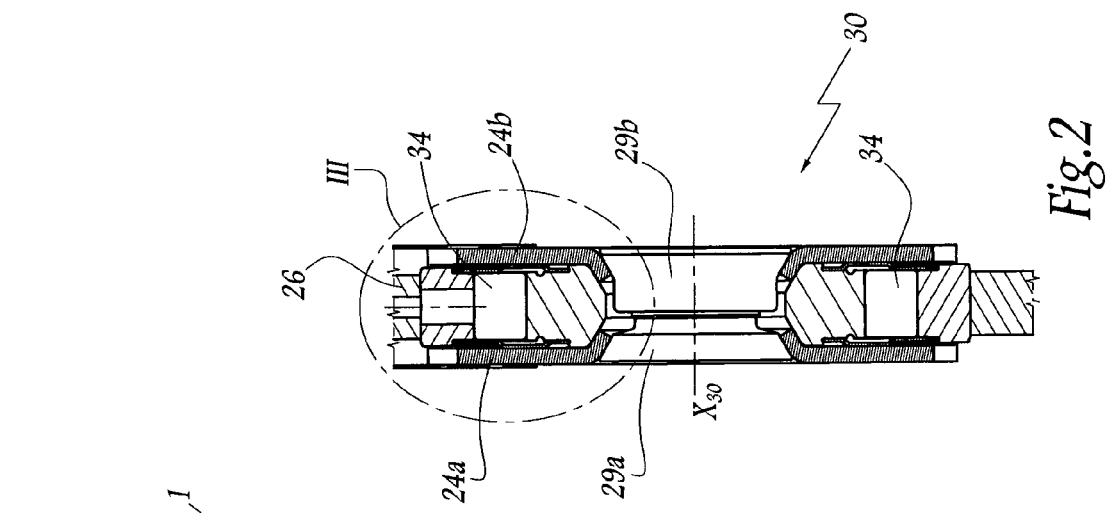
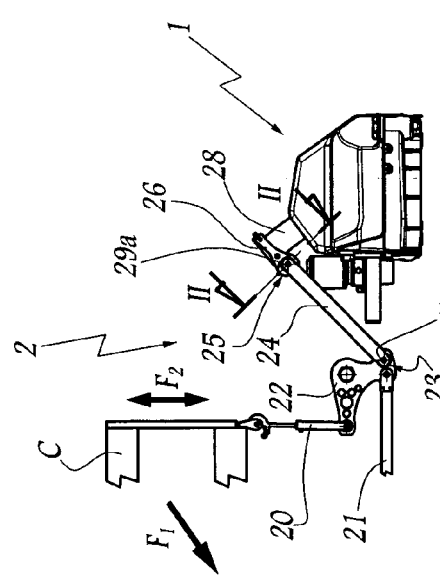
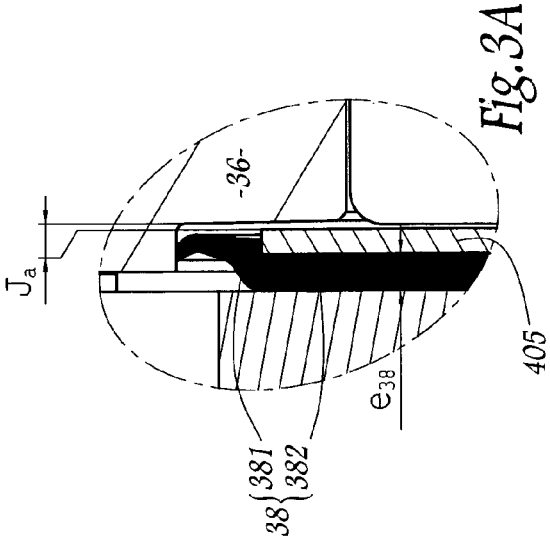

ANTIFRICTION BEARING FOR A WEAVING LOOM WITH LUBRICATING CAVITY AND WEAVING LOOM PULLING SYSTEM COMPRISING SUCH A BEARING

BACKGROUND OF THE INVENTION

1. Field of the Invention

The invention relates to a roller-type antifriction bearing intended to be fitted to a pulling system of a weaving loom and to a pulling system comprising such a bearing.

2. Brief Description of the Related Art

A weaving loom shed forming device generally comprises several heald frames individually actuated by a pulling system. The pulling system comprises a collection of link rods and levers for each heald frame, the collections being mounted in parallel in a confined space.

The elements of the pulling system are articulated to one another at pivot connections made using ball bearings or roller bearings. The latter type of bearing has a higher load-bearing capability than ball bearings. These bearings take up a limited amount of axial space because of the relatively fine way in which the space housing the collections is split up. Bearing maintenance is made more complicated because of the difficulty in accessing these bearings which generally are sited under the heald frames and relatively far apart.

EP-A-0 437 896 describes a sealed roller bearing with a relatively limited load bearing capability. The problem is that the bearing end plates which axially guide the rollers are relatively thick, thus reducing the axial length of the rollers and therefore their load bearing capability. In addition, the lip of each lateral seal lies radially level with the rollers which means that it can be pushed aside by the grease displaced from the raceways during operation. This loss of lubricant means that the bearing requires relatively frequent maintenance and its life is limited.

EP-A-0 602 711 describes a sealed roller bearing pushed into the bore of a male part consisting of a lever or a shed adjusting fastener like the one described in EP-A- 0 744 482. The load bearing capability of a roller bearing such as this is also limited by the relatively great thickness of its end plates. What is more, the end plates are coated with a layer of rubber belonging to a lip seal and the axial size of which also reduces the maximum possible length of the rollers and therefore their load bearing capability.

Moreover, in the antifriction bearing described in EP-A-0 602 711, the lubricant has a restricted free volume because this is limited merely to the gaps between the rollers. Now, these gaps are swept by the rollers as the bearing oscillates, which means that the lubricant is very highly stressed and therefore has a short life.

DE-A-1 965 0731 describes a roller bearing comprising two end plates which are positioned on the flanks of the rollers and which each define a lubricating cavity. The end plates, secured to one race of the bearing, are mounted with axial clearance with respect to lateral flanges thus giving them a certain mobility. Because of these clearances, the axial compactness of the bearing is not ideal. Furthermore, the end plates are subjected to axial loads, exerted by the rollers, without being able to transmit these loads to the flanges. These axial loads are therefore fully or partially reacted by the connection between the end plates and the race, and this may damage the end plates, their connection and/or adversely affect the sealing of the rollers. Furthermore, the antifriction bearing described in DE-A- 1 965 0731 does not include any special sealing means which means that it needs to be topped up with lubricant fairly regularly.

SUMMARY OF THE INVENTION

It is a particular object of the present invention to overcome these disadvantages by proposing a roller bearing that exerts less stress on the lubricant, that requires less maintenance, and has a higher load bearing capability than the antifriction bearings of the prior art.

To this end, the invention relates to an antifriction bearing of the roller type for a pulling system for a weaving loom, comprising:

an inner race and an outer race lying one on each side of the rollers in a radial direction and defining two cylindrical raceways, these being an inner one and an outer one respectively, two end plates secured to the inner race and positioned respectively and axially close to each flank of the rollers, each end plate lying radially beyond the raceways, the end plates and the inner race being intended to be mounted between two lateral flanges belonging to the pulling system, at least one end plate having a shape defining at least one cavity adjoining all or part of a flank of the rollers and able to accept a lubricant.

This bearing is characterized in that the inner race has two lateral shoulders each one defining an axial bearing surface for each of the flanges respectively, while the width of the inner race with its lateral shoulders is substantially equal to the distance separating the outermost axial faces of the end plates.

In other words, the antifriction bearing has a free volume in which the lubricant can accumulate without being subjected to the stresses exerted by the rolling elements. By virtue of the invention, the antifriction bearing enjoys better lubrication and therefore a longer life.

According to other advantageous features of the invention:

the bearing comprises two radial lip seals which are positioned one on each side of the rollers, each lip collaborating with a radial surface of the outer race;

each end plate has a shape defining at least one cavity;

the two end plates are structured and arranged symmetrically with respect to a plane that bisects the rollers;

the or each end plate consists of a generally flat ring having an inner radial portion and an outer radial portion both of which radial portions are annular and which are connected by an annular central groove that forms a depression recessed axially with respect to the inner and outer radial portions, the depression defining the cavity;

the outer radial portion covers an annular region of the outer race with an axial clearance;

the thickness of each shoulder is substantially equal to the axial distance separating the internal face of the inner radial portion situated facing the inner race from the external face of the central groove of the corresponding end plate;

each seal has an annular body secured to the external axial face of the outer radial portion of the corresponding end plate;

the annular body has a thickness less than the extent to which the recess of the groove is axially recessed;

the cavity adjoins the rollers over their entire radial extent;

the cavity radially adjoins part of the inner race and part of the rollers;

the lubricant is in a liquid or viscous state and the outer race is pierced with at least one radial hole intended to allow the cavities to be filled with the lubricant and at least one of the axial annular walls of the inner race has at least one chamber opening into one of the cavities and capable of accepting lubricant; and the lubricant consists of a solid-state packing extending into the cavity and between the rollers.

The invention also relates to a pulling system for a weaving loom comprising at least one link rod and at least one lever, characterized in that the link rod and the lever are connected by means of an antifriction bearing as described above, the flanges consisting of the link rod and being secured to the inner race by means of a biconical bolt clamped at the flanges.

BRIEF DESCRIPTION OF THE SEVERAL VIEWS OF THE DRAWINGS

The invention will be better understood from reading the description which will follow, given merely by way of example and made with reference to the attached drawings in which:

FIG. 1 is a front view of part of a pulling system according to the present invention;

FIG. 2 is a view on a larger scale in section on II-II of an antifriction bearing according to a first embodiment of the invention;

FIG. 3A depicts, on a larger scale, detail A from FIG. 3;

FIG. 4 is a partial perspective view of an end plate of the bearing depicted in FIGS. 2 and 3;

FIG. 5 is a view similar to FIG. 4 for an alternative form of end plate; and

DETAILED DESCRIPTION OF THE INVENTION

Figure 3:
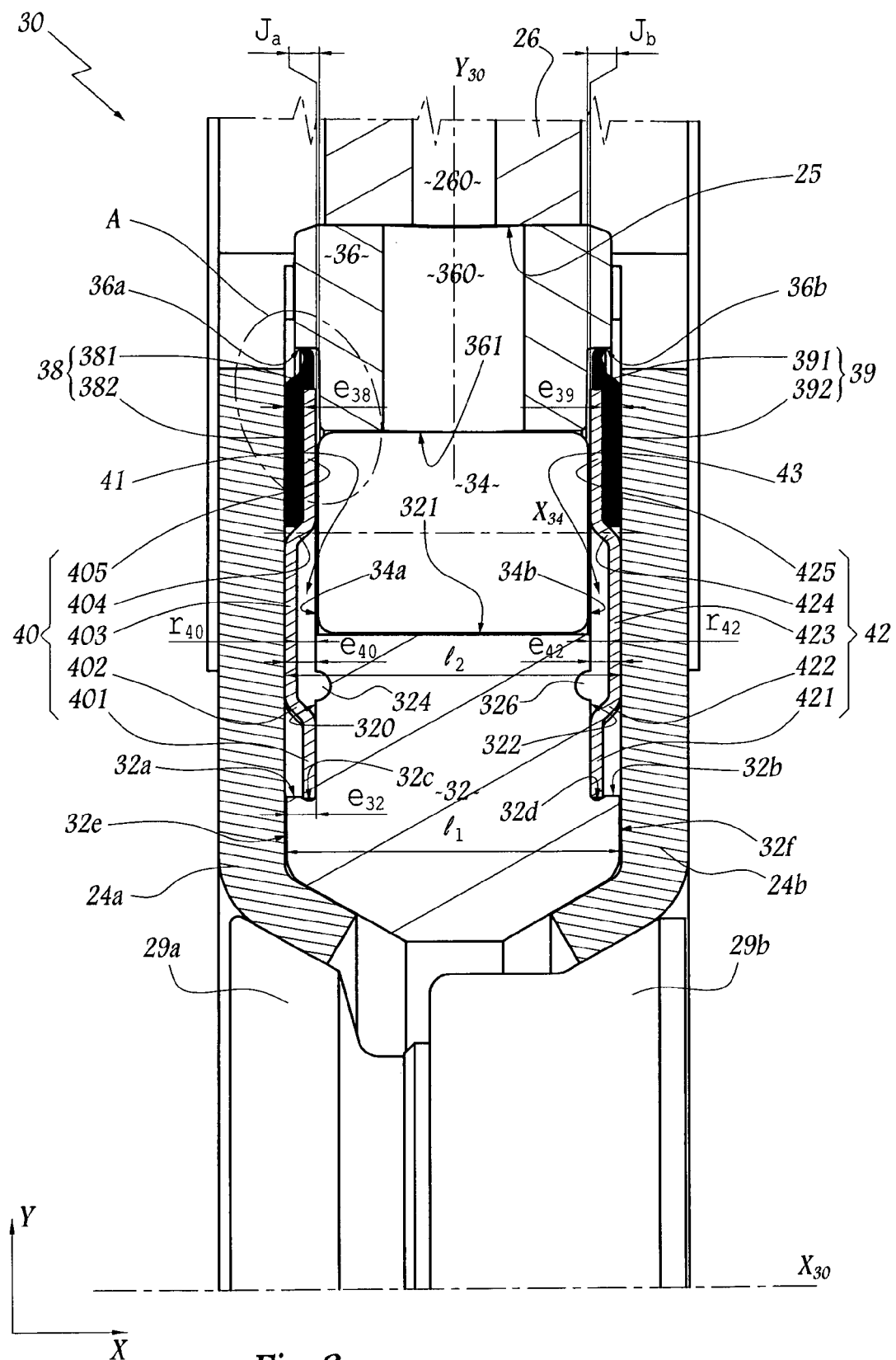
FIG. 3 depicts, on a larger scale, detail III of FIG. 2.

FIG. 1 shows a shed forming device comprising several heald frames just one of which has been depicted in this figure referenced C. In a way known per se, the frame C is equipped with healds, not depicted, through the eyelet of which there passes a warp thread symbolized by the arrow $F_1$ which indicates the direction in which it passes in a direction perpendicular to the plane of the frame C.

Each frame is oscillated vertically in the direction of the double-headed arrow $F_2$. This movement is transmitted in particular by a distal link rod 20 coupled to a bottom part of the frame C and to an oscillating lever 22. The lever 22 is connected via a proximal link rod 24 and a shed-adjusting fastener 26 to a driver 28 which is itself set in movement by a dobby 1. The pulling system 2 further comprises a link rod 21 depicted partially in FIG. 1 and intended to transmit the movement from the oscillating lever 22 to the non-depicted end of the frame C via another oscillating lever and another distal link rod.

The pivoting connections of the proximal link rod 24 with the fastener 26, on the one hand, and with the lever 22, on the other hand, are made via roller bearings described in greater detail in conjunction with FIGS. 2 to 6. The outer races of the roller bearings are intended to be assembled by push-fitting into a bore 25 of the fastener 26 or into a bore 23 of the lever 22. The inner races of the bearings are secured to the link rod by means of screws 27a or 29a and nuts clamped in the central part of the bearings.

FIG. 2 shows a bearing 30 that makes the pivoting connection between the link rod 24 and the fastener 26. The rolling elements of the bearing 30 are able to rotate about an axis $X_{30}$ of symmetry of revolution of the bearing 30. The components of the bearing 30 are guided and held axially by means of two lateral flanges here consisting of end branches 24a and 24b of the link rod 24.

As FIG. 3 shows, the antifriction bearing 30 comprises an inner race 32 and an outer race 36 between which rollers 34 roll. The inner race lies in a space delimited, in a radial direction symbolized by an axis Y, by an inner raceway 321 for the rollers 34. The outer race 36 for its part extends beyond, in the radial direction Y, the space delimited by an outer raceway 361 for the rollers 34.

The raceways 321 and 361 envelope the paths followed by the rollers 34 and in this instance are in the form of right cylinders. A cylinder is to be understood to be a cylinder on a circular base, because the rollers 34 have symmetry of revolution about their respective axes $X_{34}$. The rollers 34 are contiguous. The addition of a bearing cage between and around the rollers is possible, but that reduces the axial width available for the rollers.

The bearing 30 comprises two end plates 40 and 42 one positioned on each side of the rollers 34 in an axial direction symbolized by an axis X. The end plates 40 and 42 have the purpose of guiding and holding the rollers 34 axially. The end plates 40 and 42 are therefore able to react axial forces that might be exerted by the rollers 34.

In the example of FIG. 3, the end plates 40 and 42 are structured and arranged symmetrically with respect to a plane that bisects the rollers 34, this plane being depicted in the form of the axis $Y_{30}$ in FIG. 3. As FIGS. 3 and 4 show, each end plate 40 or 42 consists of a generally flat ring.

The end plate 40 has an inner radial portion 401 and an outer radial portion 405 which portions are annular and coplanar. The adjectives inner and outer define entities which are respectively closer to and further from the axis $X_{30}$. The inner 401 and outer 405 radial portions are connected to one another by a central groove 403, which is also annular, and which forms a depression axially recessed $r_{40}$ slightly with respect to the portions 401 and 405. A groove here denotes the solid central portion 403 of an end plate, this portion delimiting an annular and concave volume facing towards the axis $Y_{30}$. It is possible to produce the central groove 403 by pressing the end plate 40 using an appropriate tool. Bends 402 and 404 of substantially frustoconical shape are thus formed, these lying, in the radial direction Y, one on each side of the groove 403.

The foregoing description of the end plate 40 can be transposed directly to the end plate 42 in as much as the latter has a symmetric structure. The numerical references of the elements of the end plate 42 are obtained by increasing by 20 the numerical references of the corresponding elements of the end plate 40. Thus in particular the inner 421 and outer 425 radial portions, the central groove 423 and the bends 422 and 424 are obtained.

It is preferable to make the bearing end plates out of hard, wear-resistant materials such as high strength steel plate.

The extent $r_{40}$ to which the groove 403 is recessed makes it possible, when the end plate 40 is set in place beside the rollers 34, to define a cavity 41 adjoining the corresponding flank 34a of the rollers 34 and in which a lubricant can accumulate. The cavity 41 is therefore able to accept a lubricant in the liquid or viscous state, such as oil or grease, or in the solid state, such as a lubricating packing mentioned hereinafter. In addition, in the example of FIG. 3, the wall of the end plate 40 which forms the groove 403 is solid and therefore has no orifice. The cavity 41 is therefore here able to retain a fluid lubricant in a relatively sealed manner.

In the embodiment illustrated in FIG. 3, the cavity 41 adjoins the flank 34a of each roller 34 only over part of this flank that is radially limited to the space between the inner raceway 321 and the axis of symmetry $X_{34}$ of each roller 34. The bend 404 is positioned substantially on the axis $X_{34}$ of each roller 34. The portion 405 of the end plate 40 lies facing and close to the outer radial part of each roller 34.

Likewise, the groove 423 of the end plate 42 defines a cavity 43 symmetric with the cavity 41 with respect to the plane bisecting the roller 34 and adjoining the flank 34b of this roller. Because the cavities 41 and 43 lie on the flanks 34a and 34b of the rollers 34 they are not swept by the active cylindrical surfaces of the rollers 34. The lubricant that accumulates in the cavities 41 and 43, which may be termed lubrication cavities, is therefore not continuously subjected to the stresses exerted by the rollers 34 on the raceways 321 and 361, unlike the case of the antifriction bearing of EP-A-0 602 711. This feature makes it possible to lengthen the life of the lubricant and, as a result, of the bearing 30. It will be noted that the lubricant can flow around the roller 34 and between the cavities 41 and 43 by flowing through the gaps which separate each roller 34 from its neighbours.

As FIG. 4 shows, the cavity 41 defined by the end plate 40 has an annular and uniform shape. It is, however, possible to replace the end plate 40 or the end plate 42 with an end plate 50 illustrated in FIG. 5 and which has a less uniform shape. Specifically, the central portion of the end plate 50 situated between an inner portion 501 and an outer portion 505 here has a number of disjointed bosses 503a to 503d capable of defining as many lubricating cavities. The bosses 503a to 503d here are kidney-bean-shaped, limited to angular sectors inscribed on a segmented common ring in a uniform manner. Nonetheless, it is possible to define a plurality of lubricating cavities by producing end plates of different geometries.

The portions 405 and 425 extend radially until each covers an inner annular axial region of the race 36. The components of the bearing 30 are dimensioned and arranged in such a way as to leave an axial clearance $J_a$ between the race 36 and the end plate 40 and an axial clearance $J_b$ between the race 36 and the end plate 42. The axial clearance $J_a$ is visible on a larger scale in FIG. 3A. The clearance $J_b$ is not depicted to this scale because it is symmetric here with the clearance $J_a$. The axial clearances $J_a$ and $J_b$ are determined in such a way as to generate a pressure drop in order to cause the lubricant to flow from the cavities 41 and 43 towards the outside of the antifriction bearing 30. This arrangement plays a part in increasing the sealing of the bearing 30 and therefore its life. In addition, the race 36 offers a certain freedom for axial positioning by virtue of the clearances $J_a$ and $J_b$ which allow the race 32 to be screwed slightly during its oscillatory movements.

In addition, the antifriction bearing 30 comprises two lip seals 38 and 39 positioned one on each side of the rollers 34 and mounted on the respective outer external faces of the portions 405 and 425. Unlike the adjectives inner and outer, the adjectives external and internal denote entities directed in an axial direction respectively towards the outside of the bearing 30 and towards the inside of the bearing 30, that is to say towards the axis $Y_{30}$. The seals 38 and 39 have two radial lips 381 and 391 respectively, which each press against an inner radial surface consisting of a respective shoulder 36a and 36b of the race 36. A radial surface is to be understood to mean a surface perpendicular to a radial direction, as defined by the axis X, while an axial surface is to be understood to mean a surface perpendicular to an axial direction, as defined by the axis Y. Collaboration between the lips 381 and 391 and the shoulders 36a and 36b seals the bearing 30 by limiting the leaks of lubricant to the outside.

Insofar as sealing is effected on a radial surface, it is not dependent on the axial movements of the outer race 36, unlike was the case with the antifriction bearing of EP-A-0 602 711 in which the lips of the seals carried the risk of not being able continuously to perform their sealing function. This arrangement of the lips therefore increases the life of the bearing 30.

In order to carry out maintenance on the bearing 30, the race 36 has a non-blind radial hole 360 so that the cavities 41 and 43 and the gaps between the rollers 34 can be filled with a lubricant as required. The hole 360 is sited in such a way as to coincide with any lubrication hole 260 formed in the fastener 26 which here constitutes the male part for assembling the antifriction bearing 30.

The inner part of the race 32 has two lateral shoulders 32a and 32b which are symmetric and one of which lies on each side of the rollers 34. These shoulders 32a and 32b each define an axial bearing surface 32e and 32f, respectively, for the flanges 24a and 24b. Each shoulder 32a or 32b comprises a radial annular channel 32c or 32d formed respectively near axial annular walls 320 and 322 delimiting the race 32. The dimensions of the annular channel 32c and of the portion 401 of the end plate 40 allow them to collaborate with one another in order to keep the end plate 40 secured to the race 32 through an elastic and removable connection. Likewise, the end plate 42 is held in the channel 32d.

It is also possible to envisage other ways of securing the end plates 40 and 42 to the inner race 32, such as knurled crimping or welding the end plates 40 and 42 respectively centred on the shoulders 32a and 32b which then no longer requires the presence of either of the grooves 32c or 32d.

Advantageously, the axial thickness $e_{32}$ of each shoulder 32a and 32b is substantially equal to the axial distance $e_{40}$ or $e_{42}$ extending from the internal face of the inner portion 401 or 421 lying facing the inner race 32 to the external face of the groove 403 or 423 of the corresponding end plate 40 or 42. That makes it possible at the same time to hold or guide the race 32 and the end plates 40 or 42 axially using the flanges 24a and 24b. The end plates 40 and 42 and the race 32 are therefore secured by bearing surface to surface with the flanges 24a and 24b, the whole remaining, on the whole, stationary while the antifriction bearing 30 is in operation. Thus, the width $1_1$ of the race 32 with its shoulders is substantially equal to the axial distance $1_2$ separating the outermost axial faces of the end plates 40 and 42.

Thus, the axial forces which are applied by the rollers 34 to one of the end plates 40 or 42 are transmitted to the corresponding flange 24a or 24b without this end plate moving.

In addition, this feature makes it possible to maximize the axial length of the rollers 34 and therefore their load bearing capability. For the same reason, the annular bodies 382 and 392 of the lip seals 38 and 39 have respective thicknesses $e_{38}$ and $e_{39}$ less than or equal to the gap respectively separating the portions 405 and 425 from the flanges 24a and 24b. The annular bodies 382 and 392 therefore have thicknesses $e_{38}$ and $e_{39}$ less than or equal to the extents $r_{40}$ and $r_{42}$ to which the depressions that respectively define the grooves 403 and 423 are axially recessed.

The race 32 and the flanges 24a and 24b have biconical and complementary shapes so that a screw 29a and a nut 29b, both with conical or countersunk heads positioned in the middle of the antifriction bearing 30 can be tightened to immobilize the flanges around the elements 32, 34, 36, 38 to 40 and 42. Nonetheless, the antifriction bearing and the lateral flanges may be assembled using other means, such as a cylindrical rivet sandwiching the inner race and the lateral flanges.

The way in which the components of the bearing that forms the subject of the invention are arranged allows maximum use of the space available and immobilizes the bearing end plates 40 and 42 with respect to the lateral flanges.

In an alternative form that is less advantageous in terms of load bearing capability, the thicknesses $e_{38}$ and $e_{39}$ may be slightly greater than the extents $r_{40}$ and $r_{42}$ to which the depressions defining the grooves 403 and 423 are axially recessed. Thus, the outermost axial faces of the end plates 40 and 42 are formed by the annular bodies 382 and 392 of the seals 38 and 39 which themselves belong respectively to the end plates 40 and 42. These axial faces constitute the outermost axial faces of the end plates and are thus separated by an axial distance $1_2$ equal to the width $1_1$ of the race 32 with its shoulders 32a and 32b.

Furthermore, the axial annular walls 320 to 322 of the inner race 32 each have a chamber 324 to 326, these chambers opening respectively into the cavities 41 and 43. In FIG. 3, the chambers 324 and 326 are formed by annular channels which are positioned radially facing the corresponding cavity 41 or 43. The chambers 324 to 326 are hollow which means that they are able to accept lubricant, oil or grease, and thus constitute an additional reserve. This reserve further lengthens the life of the bearing 30. Other geometries for forming the chambers 324 to 326 continuously or discontinuously about the axis of the bearing 30 are conceivable. The chambers 324 to 326 are not compulsory for implementing the invention.

Figure 6:
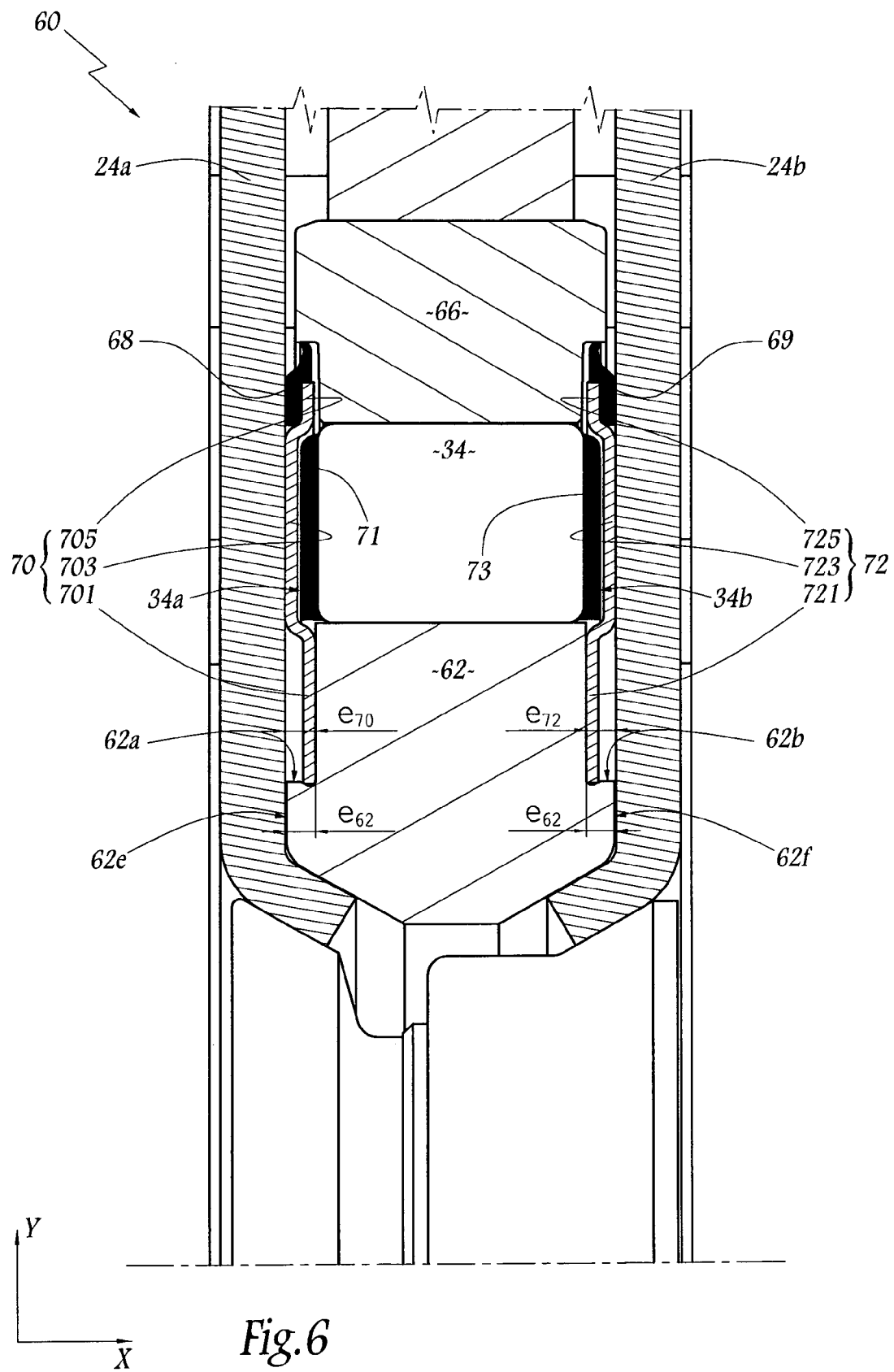
FIG. 6 is a section similar to FIG. 3 for a bearing according to a second embodiment of the invention.

The embodiment illustrated by FIG. 6 is similar to that of FIG. 3. The differences between the antifriction bearing 60 in FIG. 6 and the antifriction bearing 30 in FIG. 3 stem, on the one hand, from the dimensions of the end plates 70 and 72 and, on the other hand, from the presence of a solid and self-lubricating packing filling the cavities 71 and 73 which adjoin the rollers 34 over their entire radial extent. The solid packing is preimpregnated with liquid-state lubricant which it releases little by little as the antifriction bearing 60 runs. The composition of a packing such as this is known, for example, from U.S. Pat. No. 3,135,564. It makes it possible to produce a maintenance-free bearing with a very long life. It occupies the lateral cavities 71 and 73 and the gaps between adjacent rollers and thus forms a kind of cage within which the rollers 34 move.

The radial width of the central groove 703 or 723 of the end plates 70 or 72 corresponds substantially to the radial size of the rollers 34 which means that the cavities 71 and 73 adjoin the entirety of the flanks 34a and 34b of the rollers 34. The end plates 70 and 72 have an outer portion, 705 and 725 respectively, which is shorter than the outer portions 405 and 425 of the antifriction bearing 30 but is nonetheless long enough to produce a pressure drop with the outer race 66.

The antifriction bearing 60 is also fitted with structured radial lip seals 68 and 69 arranged in a similar way to the seals 38 and 39 of the antifriction bearing 30. However, their radial length is shortened, just like the portions 705 and 725 which respectively support them.

Furthermore, the inner portions 701 and 721 of the end plates 70 and 72 have a length respectively greater than the portions 401 and 421 of the end plates 40 and 42. The portions 701 and 721 cover practically all of the axial annular surfaces defined between the shoulders 62a and 62b which are analogous with the shoulders 32a and 32b and the raceway of the race 62. As in the first embodiment, the axial thickness $e_{62}$ of each shoulder 62a or 62b is substantially equal to the axial dimension $e_{70}$ or $e_{72}$ of the corresponding end plate 70 or 72.

The invention is not restricted to the two embodiments described but also extends to cover an antifriction bearing in which the end plates have outer and inner radial portions that are not coplanar while at the same time having a cavity of oblique profile the axial depth of which differs according to the portion concerned.

However, the axial thickness $e_{32}$ of each shoulder would be substantially equal to the axial distance measured from the internal face of the inner portion lying facing the inner face to the external face of the central groove. Thus, the antifriction bearing would maintain a width $1_1$ of the race with its shoulders substantially equal to the axial distance $1_2$ separating the external axial faces of the end plates.

The invention claimed is:

1. An antifriction bearing of the roller type for a pulling system of a weaving loom, comprising:
    an inner race and an outer race lying on opposite sides of a plurality of rollers in a radial direction and defining inner and outer cylindrical raceways, respectively,
    two end plates secured to the inner race and positioned respectively and axially close to each flank of the plurality of rollers, each end plate extending radially beyond the inner and outer raceways, the end plates and the inner race being adapted to be mounted between two lateral flanges of the pulling system, at least one end plate having a shape defining an annular cavity adjoining the plurality of rollers over an entire radial extent of adjacent flanks of the plurality of rollers and being configured to accept a lubricant, the inner race having two lateral shoulders each one defining an axial bearing surface for each of the flanges, respectively, a width of the inner race with the lateral shoulders being equal to a distance separating outermost axial faces of the end plates, and wherein the lubricant consists of a solid-state packing positioned within the annular cavity and between the rollers.

2. The antifriction bearing of the roller type according to claim 1, including two radial lip seals that are positioned one on each side of the plurality of rollers, each lip seal cooperating with a radial surface of the outer race.

3. The antifriction bearing of the roller type according to claim 1, wherein each end plate has a shape defining an annular cavity.

4. The antifriction bearing of the roller type according to claim 3, wherein the two end plates are structured and arranged symmetrically with respect to a plane that bisects the rollers.

5. The antifriction bearing of the roller type according to claim 1, wherein each end plate consists of a generally flat ring having an inner radial portion and an outer radial portion both of which radial portions are annular and which are connected by an annular central groove that forms a depression recessed axially with respect to the inner and outer radial portions, the depression defining the annular cavity.

6. The antifriction bearing of the roller type according to claim 5, wherein the outer radial portion covers an annular region of the outer race with an axial clearance.

7. The antifriction bearing of the roller type according to claim 5, wherein a thickness of each shoulder is substantially equal to an axial distance separating the internal face of the inner radial portion situated facing the inner race from the external face of the central groove of the corresponding end plate.

8. The antifriction bearing of the roller type according to claim 7, including two seals wherein each seal has an annular body secured to the external axial face of the outer radial portion of a corresponding end plate.

9. The antifriction bearing of the roller according to claim 8, wherein the annular body has a thickness less than a recessed dimension of the annular central groove.

10. A pulling system for a weaving loom comprising, at least one link rod and at least one lever, wherein the link rod and the lever are connected by means of an antifriction bearing, the antifriction bearing including an inner race and an outer race lying on opposite sides of a plurality of rollers in a radial direction and defining inner and outer cylindrical raceways, respectively, two end plates secured to the inner race and positioned respectively and axially close to opposite flanks of the plurality of rollers, each end plate extending radially beyond the inner and outer races, the end plates and the inner race being adapted to be mounted between two lateral flanges of the pulling system, at least one end plate having a shape defining an annular cavity adjoining the entire radial extent of an adjacent flank of the plurality of rollers and in which a solid state packing lubricant is retained, the inner race having two lateral shoulders each one defining an axial bearing surface for each of the flanges, respectively, and a width of the inner race with the lateral shoulders is equal to a distance separating outermost axial faces of the end plates, and the flanges consisting of the link rod and being secured to the inner race by means of a bolt clamped at the flanges.

11. The pulling system of claim 10 wherein each end plate includes an annular cavity which extends along the entire radial extent of the adjacent flank of the plurality of rollers in which the solid-state packing lubricant is received.

* * * * *